Feb. 1, 1944. A. TOWNHILL 2,340,498
PISTON
Filed July 13, 1942
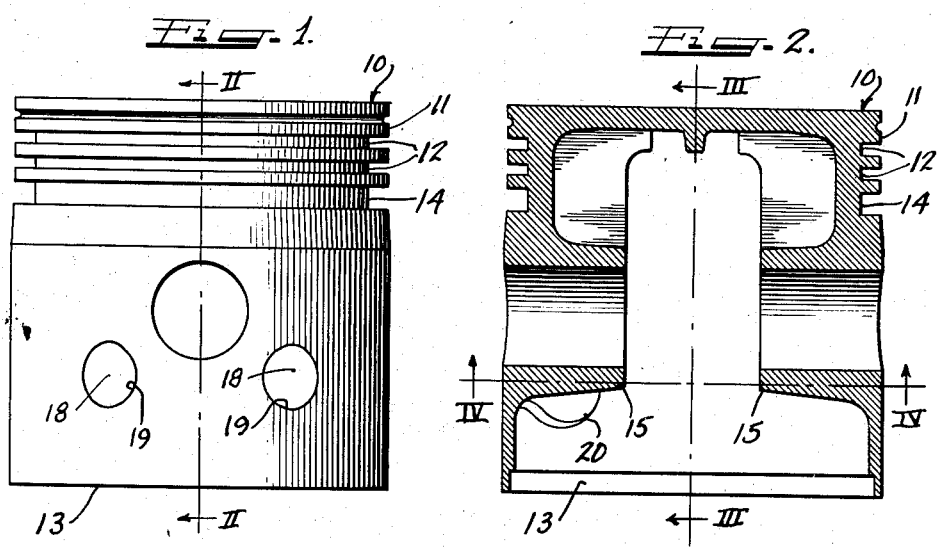
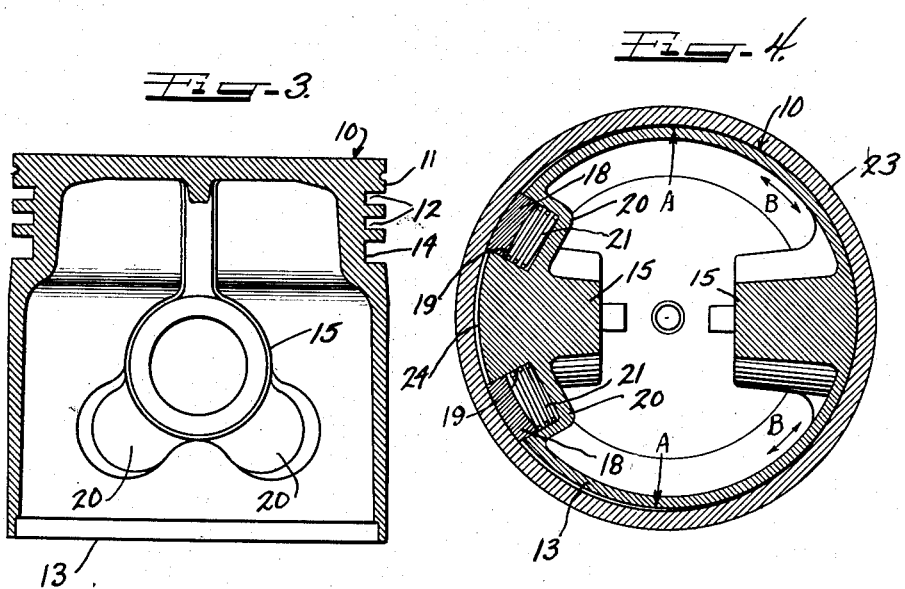
Inventor
ARTHUR TOWNHILL Patented Feb. 1, 1944

2,340,498

UNITED STATES PATENT OFFICE 2,340,498

PISTON

Arthur Townhill, Cleveland, Ohio, assignor to Thompson Products, Incorporated, Cleveland, Ohio, a corporation of Ohio Application July 13, 1942, Serial No. 450,655

8 Claims. (Cl. 309—12)

This invention relates to a piston equipped with a construction for eliminating "piston slap."

Specifically, the invention relates to an internal combustion engine piston having spring pressed means for acting on an engine cylinder in which the piston is mounted, to urge the piston against a side of the cylinder normal to the thrust receiving faces or sides thereof, and thereby cause the piston to roll smoothly against these faces or sides, instead of slapping thereagainst.

A piston is generally fabricated to accurately fit the walls of the cylinder in which it is to work. However, this fitting relationship is quite difficult and expensive to attain, and is not retained permanently. A piston which is not fitted in a cylinder with a small clearance therebetween, will have a tendency to slap. Slapping is caused by the piston striking on the metallic cylinder walls, due to the sudden displacement of the piston transversely of the cylinder. The sides or wall portions of the piston parallel to the wrist pin, are usually referred to as the "thrust faces," since the piston, in operation, will be displaced normally of the wrist pin axis in an oversize or worn cylinder, to slap these faces against the cylinder. The thrust faces soon wear the cylinder into an oval shape, thereby increasing the slapping action. Displacement of the piston in operation in directions parallel to the wrist pin axis, is resisted by the wrist pin and connecting rod, since the operating piston, to move transversely in such directions, must rock along the length of the wrist pin.

The present invention now provides a piston having at least one plug-like member, slidingly movable in a radial recess formed in the piston side wall between the thrust faces of the piston. Spring means are provided for urging this plug-like member or members outwardly against the cylinder wall portion, between the thrust face-receiving portions of the wall. The piston is thereby constantly urged away from the wall on which the plug-like member or members act against the opposite cylinder wall area, which is also between the thrust face-receiving areas of the cylinder. This constant urging of the piston against a non-thrust-face receiving cylinder wall portion confines the movements of the piston to sliding on the wall portion, thereby keeping it in constant contact with said wall portion, so that whenever transverse displacement of the piston occurs in operation, it will smoothly slide against the cylinder wall, and smoothly bring the thrust faces of the piston into contact with the thrust face-receiving walls of the cylinder. As a result, slapping or impact is eliminated.

It is, therefore, an important object of this invention to provide for a piston-cylinder assembly, means for eliminating "piston slap."

A further object of the invention is to provide a piston with means for acting on a cylinder wall, to urge the piston against a cylinder wall portion, that is disposed between the piston thrust face-receiving cylinder wall portions.

A still further object of the invention is to provide a piston with means to effect smooth sliding of the piston in constant engagement with a cylinder wall, to bring the thrust faces of the piston against the thrust face-receiving portions of the cylinder wall without impact.

A specific object of the invention is to provide a piston having a plug-like member slidably movable in a radial piston side recess, and spring urged outwardly, for the purpose of eliminating cylinder wall striking movements of the piston within a cylinder.

A further specific object of the invention is to provide a piston with a pair of spring-urged plugs disposed in a side wall portion of the piston, between the thrust faces of this side wall.

Other and further features of the invention will be apparent to those skilled in the art, from the following detailed description of the annexed sheet of drawings which, by way of preferred example, illustrates one embodiment of the invention.

On the drawing:

Figure 1 is a side elevational view of a piston according to this invention.

Figure 2 is a longitudinal cross-sectional view taken along the line II—II of Figure 1.

Figure 3 is a longitudinal cross-sectional view taken along the line III—III of Figure 2.

Figure 4 is a transverse cross-sectional view taken along the line IV—IV of Figure 2 and showing the piston of Figures 1 to 3 mounted in an oversized or worn cylinder.

As shown on the drawing:

In all the figures the reference numeral 10 indicates generally a piston according to the present invention. This piston is formed with a head 11, having peripheral ring grooves 12, and a skirt 13 depending from the head. An oil collecting groove 14 is formed about the piston at the transition from the head 11 to the skirt 13. The piston also includes opposed wrist pin bosses 15, formed in the skirt.

As best shown in Figure 4, two plugs 18 fit slidingly within recesses 19 formed in the skirt wall and extending radially inward into bosses 20 formed in the inside of the skirt 13. The recesses 19 and bosses 20 are disposed symmetrically on both sides of one wrist pin boss 15, being displaced therefrom, circumferentially of the piston, by about 30°. The recesses are suitably situated slightly below the wrist pin bosses.

Each plug or button 18 is composed of metal or other suitable material, and has a rounded free end contoured to fit the cylinder wall slidingly. A coil spring 21 or other resilient means, for instance, a dished metallic ring, is positioned between the bottom of each boss 20 and each plug 18, to urge the plug outwardly against the cylinder wall. The depths of the recesses 19, the lengths of the plugs 18, and the proportions and resiliencies of the springs 21, are so adjusted that the ends of the plugs 18 will project out of the recesses 19, under the influence of the springs 21.

The functioning of the spring-urged plugs or buttons 18 is best shown in Figure 4. In this figure, the reference numeral 23 designates a cylinder, wherein the piston 10 operates. The inner cylindrical diameter of the cylinder 23 is greater than the external diameter of the piston 10.

As shown, the springs 21 urge the plugs or buttons 18 to the left, whereby the piston 10 is urged to the right against the cylinder wall, so that a free space 24 is created between the left side of the cylinder wall and the adjacent side wall of the piston. The piston 10, in other words, is constantly kept in contact with that side cylinder wall which is opposite the plugs or buttons 18. Since the buttons or plugs 18 are between the thrust faces A, A, of the piston 10, the piston will be urged against a non-thrust-face receiving portion of the cylinder. As the piston is displaced transversely in operation, it moves at right angles to the wrist pin axis, as explained above, and the thrust faces A, A, are moved against the thrust face-receiving portions of the cylinder walls. However, in so moving to contact the thrust faces against the cylinder wall, the piston wall will ride on the cylinder wall in constant engagement therewith, because the plugs will hold the piston in such riding engagement. As a result, the transverse movement of the piston is guided by the cylinder wall, and impact or "piston slap" is avoided. In other words, the piston will ride against the cylinder wall each time that it is transversely displaced to bring its thrust faces against the cylinder wall.

This riding of the piston replaces the heretofore encountered impact or piston slap, with a smooth transverse oscillation guided by the cylinder wall.

Even though the cylinder may eventually wear into oval shape, the smooth riding of the piston in the cylinder will continue, and piston slap will be actively resisted by the spring-urged plugs, even though the cylinder wall is badly worn.

As indicated in Figure 4, the movement of the piston during any transverse displacement thereof, will be in the directions of the double headed arrows B, B.

When the piston is heated during operation of the machine or engine in which it is fitted, it will expand radially to include more of the lengths of the plugs, and to slightly increase the spring pressure. The piston of this invention can be fitted in the cylinder with a tolerance of from .003 to .004 inch, as contrasted with the heretofore necessary tolerance limit of .0005 inch.

From the above descriptions it will be understood that this invention includes pistons provided with spring urged members, effective to urge the pistons against one side wall of cylinders in which they are operating. One spring urged member positioned directly below a wrist pin boss may be sufficient, but it is preferred to use a pair of members distributed symmetrically, on both sides of the wrist pin axis of the piston and adjacent a wrist pin boss.

The spring-urged members are not intended to resist transverse displacement of the piston in operation, such as occurs when the thrust faces of the piston are contacted against the adjacent walls of the cylinder, but the spring urged members will resist piston slap caused by such transverse displacement, since they will cause the piston to be guided during such displacement, along the cylinder wall.

Many details of construction can be varied within a wide range without departing from the principles of this invention, and it is, therefore, not my purpose to limit the patent granted on this invention otherwise than necessitated by the scope of the appended claims.

I claim as my invention:

1. In a piston having opposed thrust faces, the improvement of means carried by the piston between the thrust faces thereof for urging an opposite wall of the piston between the thrust faces against a cylinder wall in which the piston may operate.

2. In a piston, the improvement including a piston side radially recessed at one level in two places symmetrically distributed about one end of the wrist pin axis of said piston, a member slidably movable in each recess, and resilient means bottoming said members to urge the same outwardly, whereby the piston is urged against one side of any cylinder wherein the piston may be disposed.

3. In a piston having a wrist pin boss, the improvement including a piston side having two radial wells slightly below said wrist pin boss and spaced peripherally from the wrist pin boss by about 30°, a member slidably movable in each well having a rounded free end adapted to slide over a cylinder wall, and spring means bottoming said members to urge the same outwardly, whereby the piston is urged against one side of any cylinder wherein the piston may be disposed.

4. In a cylinder having diametrically opposed piston thrust face receiving areas, a piston having thrust faces adapted to engage said areas of the cylinder, a radially recessed side wall on said piston between the thrust faces of the piston, and an outwardly spring urged member slidable in the recess of the side wall for urging the piston away from the adjacent cylinder wall area, and against the opposite cylinder wall area to cause the piston to ride on the cylinder wall as it is displaced transversely to bring the thrust faces thereof against the thrust face receiving areas of the cylinder wall.

5. In a piston having aligned wrist pin bosses adapted to receive a wrist pin, a pair of radial wells in the side of said piston adjacent a wrist pin boss, a small piston slidable in each well having a rounded free end adapted to slide in a cylinder in which the piston is mounted, spring means bottoming said small pistons in said wells for urging the pistons outwardly from said side wall.

6. In a piston having a transverse wrist pin axis and side wall portions defining thrust faces parallel with said axis, the improvement of spring-urged plungers carried by said piston for urging the piston in a direction parallel to the wrist pin axis for causing a portion of the piston side wall between the thrust faces to constantly ride against a cylinder in which the piston may be mounted whereby transverse displacement of the piston to bring the thrust faces into contact with the cylinder wall will be guided by the cylinder wall to resist piston slap.

7. A piston having a skirt with an integral localized pocket in the side wall thereof and a wrist pin boss adjacent said pocket, a plunger slidable in said pocket and adapted to project beyond the skirt side wall, and means urging the plunger toward a projecting position.

8. In a piston and cylinder assembly including a piston with a wrist pin axis and side thrust faces on opposite sides of the wrist pin axis together with side faces between said thrust faces, a cylinder having thrust face receiving areas and non-thrust receiving areas between said thrust face receiving areas, and a device cooperating with said assembly urging the piston longitudinally of the wrist pin axis thereof effective to maintain the piston in continuous contact with the cylinder wall, the point of contact moving from a non-thrust receiving area of the cylinder to a thrust face receiving area of the cylinder when the piston is displaced transversely of the wrist pin axis.

ARTHUR TOWNHILL.